Dec. 22, 1970   E. P. ADCOCK ETAL   3,549,440
METHOD FOR SEALING A MEMBRANE TO THE MOUTH OF A CONTAINER
UTILIZING INDUCED RADIO FREQUENCY CURRENT
Filed Oct. 26, 1967
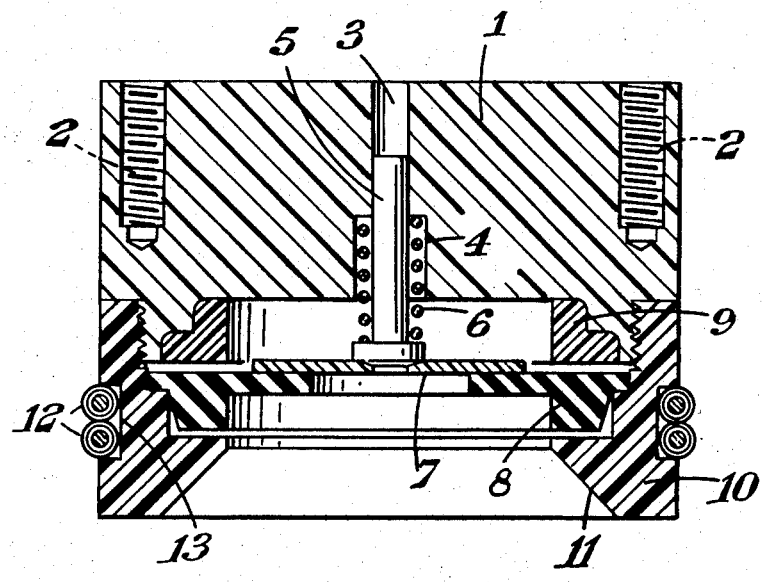
INVENTORS
EDMUND PHILIP ADCOCK
JOAN ANN STANLEY
BY Cushman, Darby & Cushman
ATTORNEYS

United States Patent Office 3,549,440
Patented Dec. 22, 1970

---

3,549,440
METHOD FOR SEALING A MEMBRANE TO THE MOUTH OF A CONTAINER UTILIZING INDUCED RADIO FREQUENCY CURRENT
Edmund Philip Adcock, Harpenden, and Joan Ann Stanley, Dunstable, England, assignors to United Glass Limited, Staines, Middlesex, England, a corporation of the United Kingdom
Filed Oct. 26, 1967, Ser. No. 678,310
Int. Cl. B65b 7/00
U.S. Cl. 156—69
10 Claims

ABSTRACT OF THE DISCLOSURE

A method for sealing a membrane to the mouth of a container, with simultaneous crimping of the membrane therearound. The membrane or the container finish is of metal. A thermoplastic material is coated on the membrane or container finish. The membrane is pressed onto both the top and side of the finish. The said metal is then heated by an induced radio frequency current to effect a readily removable seal. A suitable apparatus comprises a crimping head substantially all of insulating material and an induction coil round the head.

---

This invention relates to the heat sealing of containers with membranes.

Methods have previously been described for applying a sealing membrane alone or a membrane together with a closure cap to a container. For many applications, however, just the sealing of the container by means of a membrane is sufficient, there being no need for a separate closure cap. Such applications include, for instance, the packaging of such commodities as cream and yoghurt in plastic or glass containers, and it is often desirable when packaging such goods as these to crimp the membrane around the top of the container finish. Heat sealing of the membrane to the container finish and crimping of the membrane around the container finish have hitherto been performed in two distinct steps, the heating sealing being effected by conduction.

It is the object of the present invention to provide an improved process whereby the sealing and crimping may be effected simultaneously.

According to this invention there is provided a process for sealing a membrane to the mouth of a container with simultaneous crimping of the membrane therearound, wherein the membrane and/or container finish is or are of metal and wherein a thermoplastic material is coated on or present in the material of the membrane or the container finish, comprising placing the membrane onto the container finish, pressing the membrane onto both the top and the side of the container finish, and heating the said metal by means of an induced radio frequency current to a temperature sufficient to soften said thermoplastic material whereby the membrane is adhered to the container while being readily strippable therefrom.

The invention also provides an apparatus for effecting this operation, which apparatus comprises a crimping head substantially all of insulating material having means surrounding the head for inducing into the membrane or the container finish a radio frequency current.

By means of the invention, metallic or non-metallic membranes may be crimped onto metallic or non-metallic containers, provided that either the membrane or the container in each instance is metallic. For instance, the process of the invention may be used to crimp a metal membrane to a metal container, a glass container, a ceramic container, or a synthetic plastic container.

If neither the membrane nor the container finish is of thermoplastic material, it will be necessary to provide a coating of thermoplastic material on either the membrane or container finish. Even if the membrane or container finish is of thermoplastic material, it is desirable to apply a coating of thermoplastic material to the membrane or container finish since it is thereby easier to ensure a good seal and to obtain a clean removal of the membrane. In the case of a synthetic plastic container, and in the normal case of desiring to avoid distortion of the container finish, the thermoplastic coating should have a melting point lower than the material of the container. In fact, whatever the material of the membrane and container, the thermoplastic coating should preferably have a melting point lower than the material of the membrane or container.

By means of the invention also membranes of non-metallic material may be crimped onto metal containers. For instance, a paper membrane may be applied to a metal container by applying to the membrane or to the finish of the container the thermoplastic heat sealing coating. Again, a thermoplastic membrane may be applied to a metal container, and here it is not absolutely necessary, although it is generally desirable as mentioned above, to use a thermoplastic coating.

The sealing membrane is preferably metallic, and will generally be of non-ferromagnetic material since hysteresis losses at radio frequencies or negligible. It may be of any metallic foil, but aluminum foil is the most preferred, though tin foil also makes a good membrane. Another example is tin-antimony foil. Before selecting the metal for the membrane consideration should, of course, be had to the contents of the container to be sealed. The metal of the membrane should normally be inert with respect to the contents of the container, unless of course a coating of thermoplastic material thereon is sufficient protection. The thickness of the foil membrane should be as thin as possible consistent with it being free from pin holes and readily handleable. Normally this will be be-between 0.025 and 0.05 millimetre. Non-metallic membranes include, inter alia, those made from paper, Cellophane (registered trademark), glassine, polythene, polypropylene, polystyrene, polyvinylchloride, styrene copolymers, cellulose acetate, polycarbonates, and phenoxy resins.

The thermoplastic coating may be, for example, of a vinylite resin, a natural or synthetic wax, or a microcrystalline wax mixture. It may also be of polythene or polypropylene, or one of the many heat sealing coatings which are readily available, and which consist substantially of mixtures of plastic materials and resins. Examples include those which are sold under the trade names "Surlyn," "Telstic," "Delseal," "Imseal," "Thermostik" and "Elvax." The thermoplastic material may be coated on the whole of the underside of the membrane, or it may be coated in the form of an annular ring on the periphery thereof. The former is preferred when the membranes are stamped in large numbers from sheet material, since the sheet material may suitably be coated beforehand.

Plastic containers onto which membranes may be sealed by means of the present invention include those made from polythene, polyvinylchloride, polystyrene, styrene copolymers, for example acrylo-nitrile-butadiene-styrene copolymers, polypropylene, cellulose acetate, polycarbonates and phenoxy resins such as high molecular weight polyhydroethers.

A suitable apparatus for use in the invention is illustrated in the accompanying drawing which is a sectional elevation of a crimping head.

In the drawing, a crimping head body 1 is attachable to the underside of a press (not shown) by means of bolts 2. The body 1 is provided with a central bore 3 having an enlarged downward portion 4. A plunger 5 is reciprocable within the bore 3 and urged downwardly by a compression spring 6 housed in the portion 4. On the lower end of the plunger 5 is mounted a disc 7 which carries a crimping ring 8 of rubber or other resilient material. A seating ring 9 is fitted to the body 1 just above the crimping ring 8. A retaining ring 10 is fitted to the body 1 to limit downward movement of the crimping ring 8 and has a downwardly and outwardly flaring underside surface 11. The two windings of an induction coil 12 are housed in a peripheral groove 13 of the ring 9. The body 1, plunger 5, disc 7 and rings 9 and 10 are all made out of insulating material which may, for example, be nylon or the plastic material sold under the trademark "Tufnol." The spring 6 may be made of a bronze phosphor metal and should be as small as possible so as not to absorb excessive radio frequency energy.

In operation, a thermoplastic coated metal membrane in dishlike form is placed over the container mouth. The whole crimping head is brought down onto the membrane. The flaring surface 11 ensures that the container mouth is centralised, and the crimping ring 8 is forced as a snug fit over the container mouth, thereby crimping the edge of the membrane round the side of the mouth. Further downward pressure of the head forces the plunger 5 upwards and the outer portion of the crimping ring 8, coming up against the seating ring 9, is deflected downwardly and inwardly to effect an even stronger crimping effect. The inducting coil is then actuated to heat the membrane, soften the coating thereon and hence effect a seal.

An advantage of the present invention is that a double seal can be obtained, when required, both on the top of the container finish and on the side thereof. Such a double seal has not hitherto been obtainable by means of a single stage operation.

What is claimed is:

1. Process for sealing a membrane to the mouth of a container with simultaneous crimping of the membrane therearound wherein the membrane and/or container mouth is or are of metal and wherein a thermoplastic material is coated on or present in the material of the membrane or the container mouth, comprising placing the membrane onto the container mouth, pressing and deforming the membrane onto both the top and the side of the container mouth whereby the edge of the membrane crimps around the side of the container mouth, and heating the said metal by means of an induced radio frequency current to a temperature sufficient to soften said thermoplastic material whereby the membrane is adhered to the container while being readily strippable therefrom.

2. Process as claimed in claim 1 wherein a coating of thermoplastic material is provided on the membrane or container mouth, and such thermoplastic material is of lower melting point than the material of the membrane or container.

3. Process as claimed in claim 1 wherein the membrane is of metal and has a coating of the thermoplastic material.

4. Process as claimed in claim 1 wherein the membrane is of non-ferromagnetic metal.

5. Process as claimed in claim 4 wherein the membrane is of aluminum foil.

6. Process as claimed in claim 4 wherein the membrane is of tin-antimony foil.

7. Process as claimed in claim 1 wherein the membrane is of paper, glassine, polythene, polypropylene, polystyrene, polyvinylchloride, a styrene copolymer, cellulose acetate, a polycarbonate or a phenoxy resin.

8. Process as claimed in claim 1 wherein the thermoplastic coating is a vinylite resin, a natural or synthetic wax, a microcrystalline wax, polythene or polypropylene.

9. Process as claimed in claim 1 wherein the container is of metal, glass, ceramic or synthetic plastic.

10. Process as claimed in claim 9 wherein the container is of polythene, polyvinylchloride, polystyrene, a styrene copolymer, polypropylene, cellulose acetate, a polycarbonate or a phenoxy resin.

References Cited

UNITED STATES PATENTS

| | | | |
|---|---|---|---|
| 843,845 | 2/1907 | Reed | 156—69X |
| 1,814,135 | 7/1931 | Ellis | 156—69X |
| 2,019,360 | 10/1935 | Punte | 156—69 |
| 2,019,841 | 11/1935 | Black et al. | 156—69 |
| 2,023,341 | 12/1935 | Downes-Shaw et al. | 156—69 |
| 2,634,012 | 4/1953 | Copeman | 156—69X |
| 2,634,013 | 4/1953 | Atwood | 156—69X |
| 2,645,591 | 7/1953 | Makrauer | 156—69 |
| 2,802,593 | 8/1957 | Slaughter | 156—69X |
| 3,356,552 | 12/1967 | Pearl | 156—69 |
| 3,383,256 | 5/1968 | Carbone | 156—69 |
| 3,460,310 | 8/1969 | Adcock et al. | 156—69X |

CARL D. QUARFORTH, Primary Examiner

S. J. LECHERT, JR., Assistant Examiner

U.S. Cl. X.R.

53—39, 42; 113—121; 156—210, 212, 215, 221, 272, 306; 215—39